United States Patent [19]

Hudimac, Jr.

[11] Patent Number: 4,741,221
[45] Date of Patent: May 3, 1988

[54] FEED AND RAPID RETURN MEANS FOR MACHINE TOOLS

[75] Inventor: George S. Hudimac, Jr., Allentown, Pa.

[73] Assignee: Mechanical Service Co., Allentown, Pa.

[21] Appl. No.: 906,937

[22] Filed: Sep. 15, 1986

[51] Int. Cl.[4] .................. F16H 1/20; F16H 55/17; F16H 3/44
[52] U.S. Cl. .................. 74/424.8 NA; 74/424.8 R; 74/459; 74/405
[58] Field of Search ........ 74/89.15, 424.8 R, 424.8 A, 74/424.8 NA, 405, 459

[56] References Cited

U.S. PATENT DOCUMENTS

| | | | |
|---|---|---|---|
| 2,472,002 | 5/1949 | Clark | 74/459 |
| 2,958,232 | 11/1960 | Benninghoff et al. | 74/424.8 R |
| 3,029,792 | 4/1962 | Rasmussen | 74/424.8 R |
| 3,169,407 | 2/1965 | Newell | 74/424.8 R |
| 3,296,880 | 1/1967 | Maroth | 74/424.8 R |
| 3,334,526 | 8/1967 | Flarsheim | 74/424.8 R |
| 3,546,930 | 12/1970 | Flarsheim | 74/459 |
| 4,198,872 | 4/1980 | Metz | 74/424.8 NA |

Primary Examiner—Lawrence Staab
Assistant Examiner—Joseph J. Meter
Attorney, Agent, or Firm—Frederick J. Olsson

[57] ABSTRACT

The combination of a lead screw and a multi-ball nut. The balls are disposed around the axis of the lead screw. The balls are mounted on the nut either to be received and retained in the valley of the lead screw thread (whereby rotation of the lead screw causes movement of the nut along the lead screw in one direction for a feed operation) or for the balls to be movable out of the valley onto the crest of the thread. The latter condition permits the nut to be moved along the lead screw in a reverse direction for a quick return operation.

2 Claims, 2 Drawing Sheets

FEED AND RAPID RETURN MEANS FOR MACHINE TOOLS

This invention relates in general to drives for machine tool slides arranged to move or feed a tool or work piece for a working operation and then move the tool or work piece back in a non-working return stroke. More specifically, the invention relates to a lead screw-ball nut type slide drive incorporating means providing for a very rapid return.

The invention contemplates a slide drive comprising a lead screw and ball nut thereon, with the balls of the nut being controlled whereby the nut is driven by the thread of the screw at a precise linear speed and position for the feed or working operation and controlled so that at the end of the feed or working operation the balls are disengaged from the thread whereby an external force can move the nut back over the screw for the return stroke.

There are several feed and rapid return arrangements for machine tool slides and all of these have substantial handicaps such as the inability to obtain precise linear speed in the feed operation, the inability to precisely maintain the slide in the desired position for the working operation and requiring components of impractical size.

The present invention overcomes the various problems associated with known feed and rapid return devices and yet provides a drive mechanism which attains precise speed and position while at the same time providing for very rapid return.

The invention will be described below in connection with the following drawings wherein.

Figure 1:
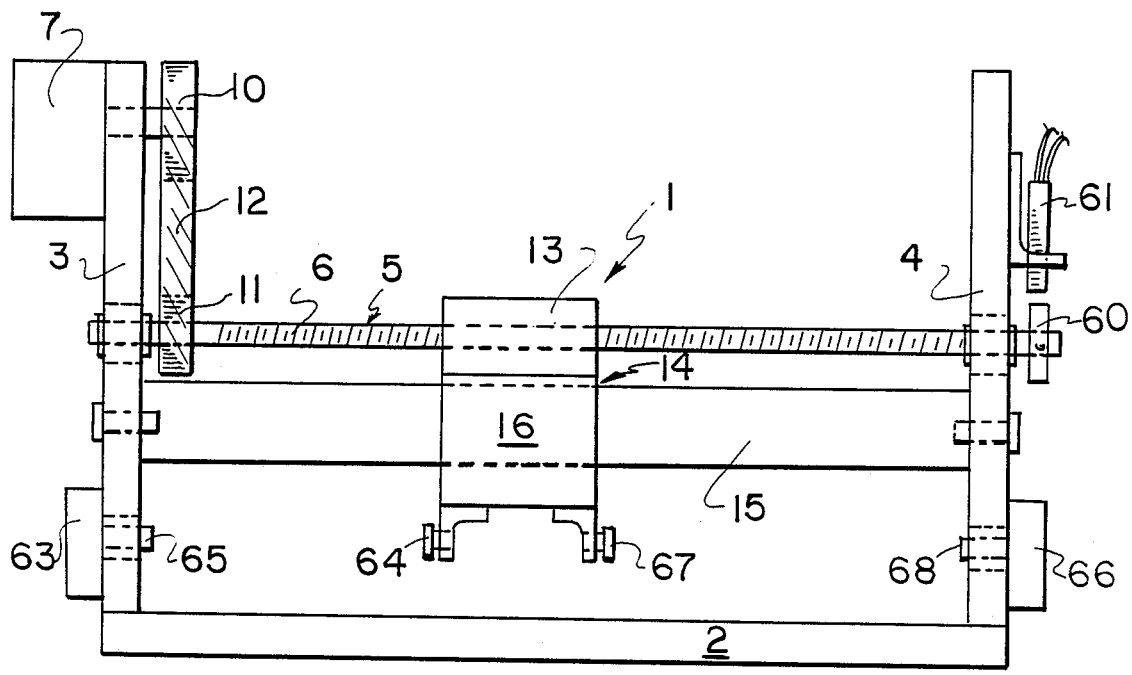
FIG. 1 is a diagramatic elevational view of a machine tool incorporating my invention.
Figure 5:
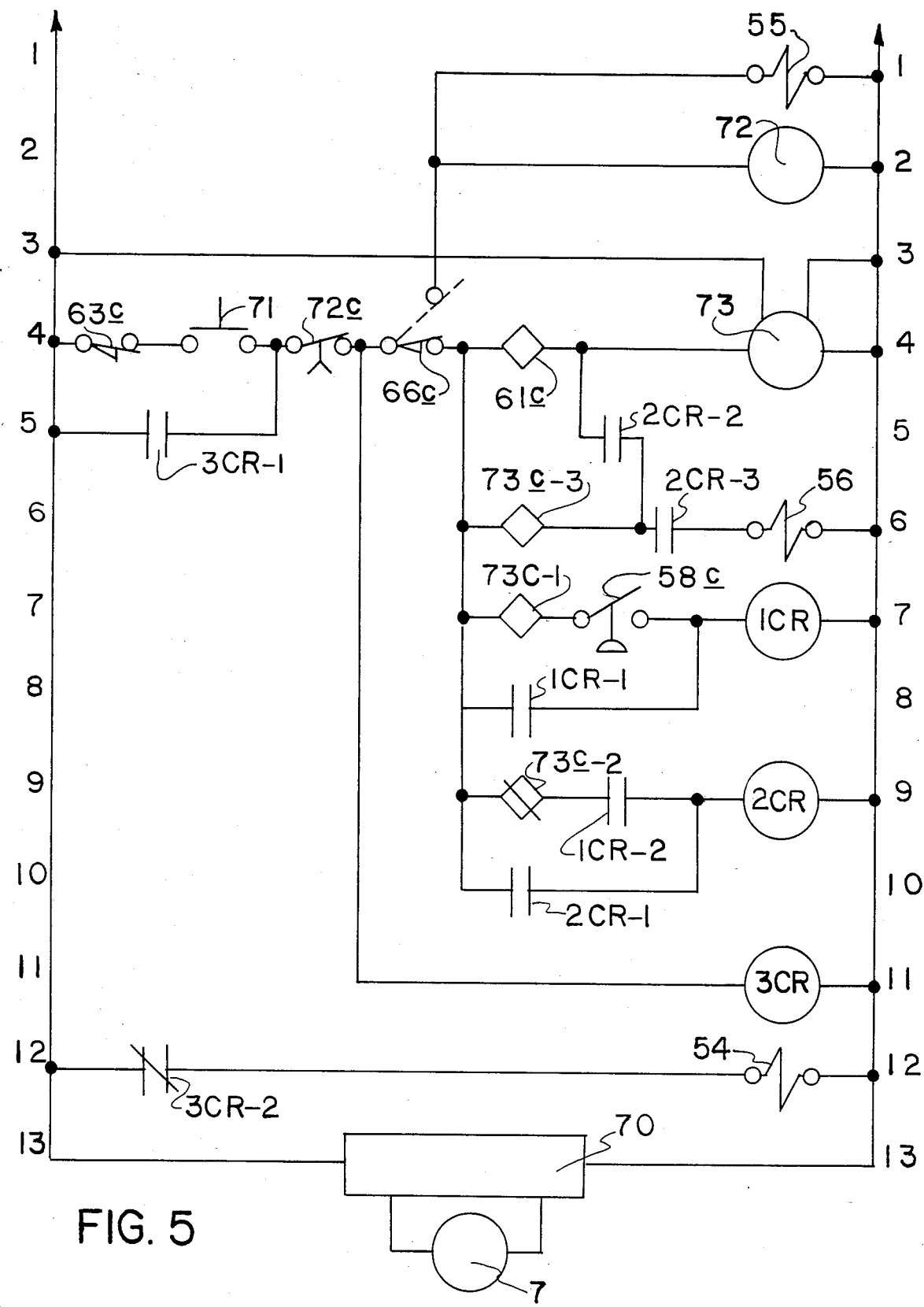

FIG. 5 is a ladder or line diagram of a typical circuit employed in the machine of FIG. 1; and Referring to FIG. 1 the machine tool 1 has a frame comprising the base 2 and uprights 3 and 4. A lead screw 5 is rotatably mounted on the uprights 3 and 4. The lead screw has a thread 6. The upright 3 mounts a D.C. drive motor 7. A pulley 10 on the shaft of the motor 7, a pulley 11 on the lead screw 5, and a timing belt 12 connecting the pulleys provide for the motor 7 to rotate the lead screw.

The lead screw 5 has a ball nut 13. Between the uprights 3 and 4 is a rodless cylinder assembly 14 having cylinder 15 and saddle 16 which is connected to the ball nut 13. While it is not shown, it will be understood that the ball nut 13 is connected to a machine tool slide.

In the arrangement of FIG. 1, the ball nut of the saddle moves from left to right for the feed or working operation and moves right to left in the return stroke. Thus, the start position for the feed or working operation is with the ball nut and saddle all the way to the left hand side and termination of the feed or working operation is with the ball and saddle all the way to the right-hand side.

As will be explained more in detail later, rotation of the lead screw (with the rodless piston assembly 14 inoperative) drives the ball 13 nut for the feed or working operation and at the termination of same the rodless piston assembly 14 (with the balls of the nut rendered inoperative) is employed to drive the ball nut 13 in a rapid return stroke.

I will now explain the preferred structure of the ball nut 13 to accomplish the foregoing feed and return drive conditions.

Figures 2, 3:
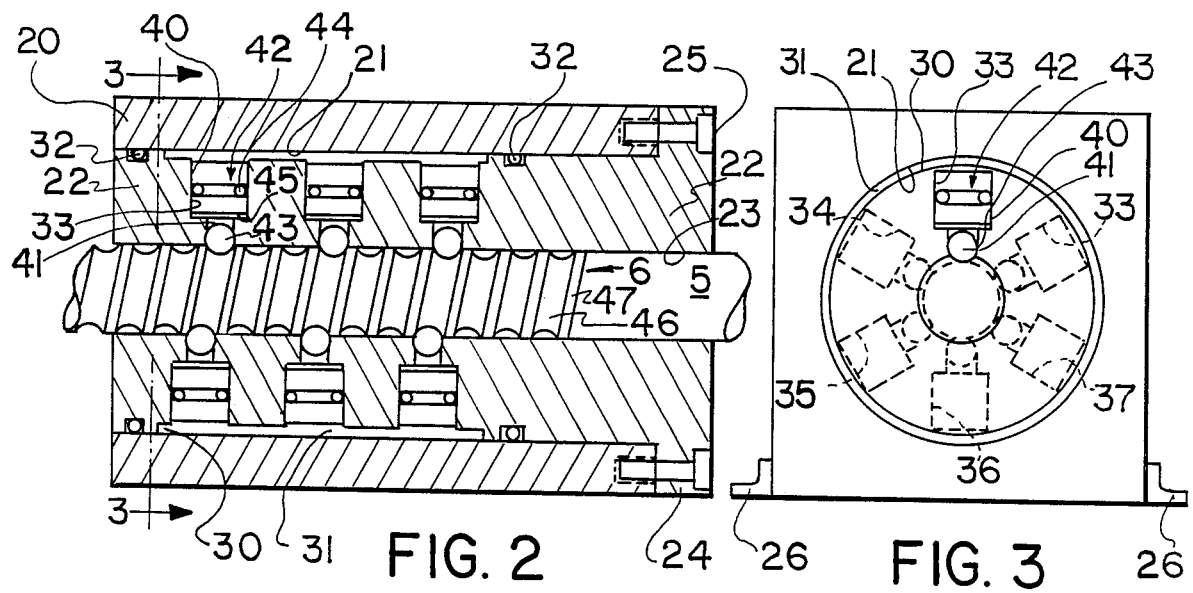
FIG. 2 is an elevational sectional view of the lead screw and the ball nut of my invention.
FIG. 3 is a view taken along the lines 3—3 of FIG. 2.

Referring to FIG. 2, a housing 20 of the ball nut 13 has a central bore 21 within which is a spool 22 having a bore 23 which receives the lead screw 5. The flange 24 of the spool carries bolts 25 which secure the spool to the housing. As previously mentioned, the ball nut 13 is secured to the saddle 16 of the rodless cylinder and this is done such as by brackets 26 noted in FIG. 3 which are bolted to the top of the saddle 16.

The outer surface of the spool 22 has a groove 30 which, in cooperation with the bore 21, forms an air chamber 31. The spool has O-rings 32 which seal the air chamber 31.

The spool 22 is formed with a first set of bores comprising the radial bores 33 through 38 (FIG. 3) which are symetrically disposed around the axis of the lead screw each being separated by an angle of 60°.

The bores 33-38 are identical in size. As particularly noted for the bore 33, the bore includes a piston section 40 and a ball section 41. The piston section carries a piston 42 and the ball section carries a ball 43. Each piston section is open to the air chamber 31 and each ball section is open to the lead screw 5. The piston 42 carries an O-ring 44 which seals the chamber 31. The piston 41, of course, is slidable in its piston section and the ball 43 makes a snug, sliding fit with ball section 41. The other bores 34-38 carry identical pistons and balls and, therefore, the description will be only in connection with the bore 33, piston 42, and ball 43.

The thread 6 of the lead screw has a valley 46 and crest 47. As shown in FIG. 2, the ball 43 is disposed in the valley 46 and makes a rolling fit with same.

The ball section 41 is of smaller diameter than the piston section 40 and this forms a lower shoulder 45 between the sections. As will be apparent when air is introduced into the air chamber 31, the piston will be forced down against the shoulder 45. The dimensions of the parts are such that when the piston 42 is down on the shoulder 45 and the ball 43 is engaging the valley 46, there is about a 0.004-inch clearance between the tip of the ball and bottom of the piston. This confines the ball in the valley but does not presson the ball and, therefore, does not restrain the rolling motion of the ball. Under the foregoing condition, therefore, the ball will be interengaged between the spool 22 and the valley 46 and rotation of the lead screws will exert a force on the nut 13 to move the same along the screw. Since the nut 13 will be connected to a slide carrying a work piece or a tool, such motion will feed the tool or work piece for the desired cutting, grinding, or like operation.

When the air chamber 31 is connected to exhaust, the pressure on the piston 42 is relieved. It will be evident, therefore, if the lead screw is turned, the ball 42 will be forced upwardly on the crest 47 and the nut 13 will not be moved by screw rotation. Also, under the relieved condition, if an axial force is applied to the nut 13, the ball 42 will be forced up out of the valley 46 on to the crest 47. As the force is continued, the ball will be moved down into the valley and then up on top of the crest, etc.

The foregoing relieved condition of the ball 42 constitutes the quick return condition of the nut 13, the force for the return being provided by the rodless cylinder saddle 16 as more particularly noted later on.

I will now describe the electrical and pneumatic means for operating the arrangement of FIG. 1. Power is normally 120 volts A.C. and air pressure is about 80 p.s.i. In FIG. 5 the lines are numbered 1–13.

Figure 4:
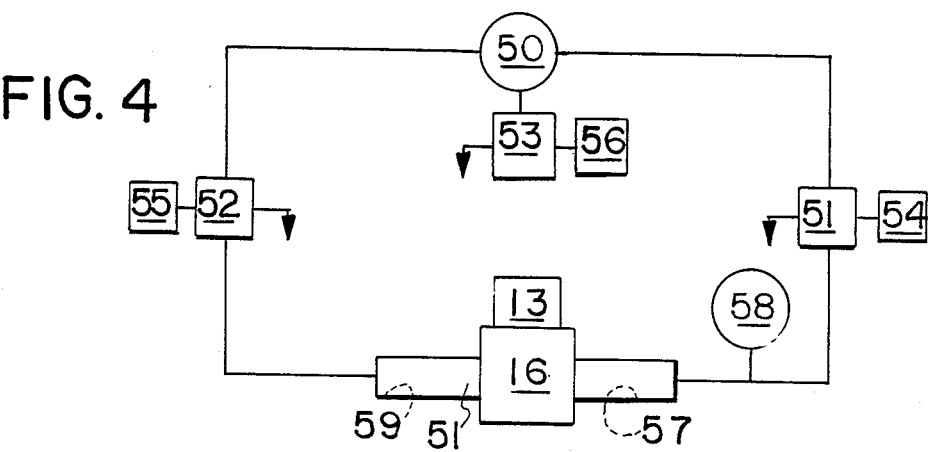
FIG. 4 is a schematic diagram of an air circuit employed in the machine of FIG. 1.

First, referring to FIG. 4, I have illustrated the hydraulic circuit. This includes the air pump or source 50 which supplies air to valves 51, 52, and 53. Each of these valves is the three-way type having an entrance port, an exit port, and an exhaust port. The valves are respectively controlled respectively by ball nut return solenoid 54, ball nut hold solenoid 55, and ball engage solenoid 56.

The valve 51 is connected to the right hand chamber 57 of the rodless cylinder 15 and to a pressure switch 58. The valve connects the chamber 57 either to the air source 50 or to exhaust depending upon the operation of ball nut return solenoid 54.

The valve 52 is connected t the left-hand chamber 59 of the rodless cylinder 15. The valve connects the chamber 59 either to the air source 50 or to exhaust depending upon the operation of ball nut hold solenoid 55.

The contacts of the pressure switch 58 are indicated in FIG. 5 at 58c (see line 7). When chamber 57 is connected to exhaust, the pressure switch contacts 58c are closed and are opened when the chamber 57 is connected to the air source 50. The foregoing is to ensure that the chamber 57 is connected to exhaust during the feed operation and connected to the source for the rapid return operation. The valve 53 is connected to the air chamber 31 in the ball nut 13. The valve 53 connects the chamber 31 to either the air source 50 or to exhaust depending upon the operation of ball engage solenoid 56.

Referring back to FIG. 1, the end of the lead screw 5 supported by upright 4 carries an adjustable actuator 60. The standard mounts inductive type proximity switch 61 the head of which is near the actuator 60. The actuator is made of two segments one metal and one non-metal which are clamped to the end of the lead screw.

In FIG. 5, the contacts of the proximity switch are identified at 61c (see line 4). During the time the metal segment rotates past the head of the proximity switch the switch is in closed condition and during the time the non-metal part rotates past the head the proximity switch is in open condition.

The purpose of the proximity switch is to permit air to enter the air chamber 31 only when the balls each have assumed a position directly over the valley 46. In this way, the force put on the nut 13 by the screw 5 for the feed operation does not cause the balls to suddenly impact the nut and cause the same to jump. The ideal spot is located simply by shifting the actuator on the screw 5 until the nut 13 goes smoothly into the feed operation.

The operational rate of the proximity switch 61 is a function of the rotational speed of the lead screw which may be substantial. Thus, a solid state switch is preferred over a mechanical make and break switch.

The upright 3 mounts a limit switch 63. The saddle 16 carries an actuator 64 which is adapted to engage the button 65 of the limit switch 63. The contacts of the limit switch 63 are indicated in FIG. 5 at 63c (see line 4). These contacts are closed when the ball nut and saddle are in the start position. When the ball nut and saddle move away from the start position and the actuator 64 disengages from the button 65 the contacts 63c are opened.

The upright 4 mounts on limit switch 66. The saddle 16 carries an actuator 67 which is adapted to engage the button 68 of the limit switch. The contacts of the limit switch 66 are indicated in FIG. 5 at 66c (see line 4). The contacts 66c are biased so that the contacts assume the full line position as shown during the time the ball nut and saddle are in the start position and during the feed or working operation. At the end of the feed, with the actuator 67 and botton 68 engaged, the contacts 66c assume the position shown by the dotted lines.

Referring to FIG. 5 line 13, the motor 7 is controlled by a variable speed drive 70. Both the motor 7 and the drive 70 are the conventional type.

The circuit employs control relays 1CR, 2CR, and 3CR as noted in lines 7, 9, and 11 of FIG. 5. These control relays have various contacts in the circuit which function a will be noted shortly.

The circuit also employs a dwell delay relay 72 (line 2). The contacts of the relay are indicated at 72c in line 4. The purpose of this relay is to cause the ball nut and saddle to momentarily pause at the end of the feed or working operation. This is to insure that any cutting operation by a tool will have a chance to be completed before the rapid return takes place.

Referring to line 4 in FIG. 5, it will be noted that the proximity switch contacts 61c are in series with the relay 73. Due to the rapid operation of the proximity switch the relay 73 is a solid state type rather than a mechanical contact type. The contacts of the relay 73 are indicated at 73c-1, 73c-2, and 73c-3 respectively in lines 6, 7, and 9. The contacts 73c-1 and 73c-3 are normally open. The contacts 73c-2 are normally closed.

With the above in mind, I will now describe the operation of the machine of FIG. 1 beginning with the ball nut and saddle in the start position and then through the feed or working operation and thence back to the start position via the quick return.

The motor 7 is turned on and its speed set via the speed controller 70.

The feed is started by depressing the push button switch 71 (line 4). Since contacts 63c and 72c (line 4) are closed the control relay 3CR (line 11) is energized. The contacts 3CR-1 (line 5) close and this holds up the relay 3CR. At the same time, the contact 3CR-2 (line 12) opens so that the solenoid 54 is deenergized. Referring to FIG. 4, the solenoid 54 actuates the valve 51 so that the chamber 57 of the rodless cylinder 15 is connected to exhaust. With no pressure in chamber 57, the contacts 61c (line 7) close. The foregoing insures that there is no pressure in chamber 57 to retard the motion of the saddle 16 and hence ball 13 for the working operation.

Note that the contacts 66c (line 4) are in the full line position and solenoid 55 (line 1) is deenergized and valve 52 (FIG. 4) has connected the chamber 59 of the rodless cylinder to exhaust.

With the above condition, at the instant the metal section of the actuator 60 comes under the head of the proximity switch 61, the proximity switch contacts 61c close (line 4) and relay 73 is energized.

The contacts 73c-1 (line 7) close and with contact 61c also closed, the relay 1CR is energized. The contacts 1CR-1 (line 8) hold up the relay.

The contacts 1CR-2 (line 9) close. With the contacts 73C-2 now closed, the relay 2CR will be energized and the contacts 2CR-1 (line 10) will close and hold up the relay.

The energizing of relay 2CR closes contacts 2CR-2 (line 5) an contacts 2CR-3 (line 6). Since contacts 73c-3 are closed, relay 73 is held up via closed contact 2CR-2 (line 5). With contacts 73c-3 and 2CR-3 (line 6) both closed, the ball engage solenoid 56 will be energized.

With the energizing of ball engage solenoid 56, the valve 53 is operated to connect the chamber 31 with the air source 50. The pistons function to hold the balls in working engagement with the lead screw and the screw moves the ball nut and saddle in the feed mode.

The feed continues until the actuator 67 on the ball nut and saddle engages the button 68 in the limit switch 66. This shifts the contacts 66c (line 4) to the dotted-line position.

One affect of the shifting of the contacts 66c to the dotted-line position is to deenergize the relay 73 (line 4), the ball engage solenoid 56 (line 6), and the control relays 1CR and 2CR (lines 7 and 9).

The other affect of the shifting of switch contacts 66c to the dotted line position is to energize the dwell relay 72 (line 2) and the ball nut hold solenoid 55 (line 1).

The energizing of the ball nut hold solenoid 55 operates the valve 52 so that the chamber 59 of the rodless cylinder is connected to air source 50 to hold nut 13 in position.

The energizing of the dwell relay 72, after a time delay of about one second, opens the contacts 72c (line 4). This deenergizes the control relay 3CR and the hold up contact 3CR-1 (line 5) open and the contacts 3CR-2 close to energize the ball nut return solenoid 54 (line 12). The solenoid 54 operates valve 51 to connect chamber 57 with the air source 50. Since the ball engage solenoid (line 6) is deenergized, the valve 53 is connected to air chamber 31 of the ball nut to exhaust and the balls are free as previously described.

Thus, the pressure in chamber 57 causes the saddle 16 and ball nut 13 to quickly move back to the start position.

The circuit is now set up for the start of another operation as previously described.

In connection with the quick return motion of the ball nut 13, the invention contemplates that each piston can be provided with a bar magnet, the head of which is flush with the inner face of its piston. The strength of the magnet is chosen so that a ball forced out of the valley and engaging the piston will be held away from the valley by the magnet.

What is claimed is:

1. In the combination of a lead screw having a thread thereon and a ball nut on the screw, the nut comprising:
    a housing having a bore surrounding and coaxial with said lead screw;
    a spool inside of said housing and secured thereto;
    a bore inside of said spool coaxial with first said bore and receiving said lead screw for rotation therein;
    an annular groove on the outer surface of the spool cooperating with first said bore to form an air chamber;
    a set of bores comprising a plurality of radial bores in said spool disposed around the axis of said screw and each radial bore having a piston section and a ball section of smaller diameter than the piston section, each piston section being open to said air chamber and each ball section being open to said lead screw;
    a plurality of balls respectively in said ball sections, each ball making a snug, rolling fit with its section;
    a plurality of pistons respectively in said piston sections, each piston carrying an O-ring making an air seal between the piston and the piston section;
    means to admit air to said air chamber and to create air pressure on each of said pistons and to exhaust the air from said chamber to relieve the air pressure on said pistons;
    said air pressure on said pistons causing each piston to be positioned in its bore to confine the respective balls between the valley of the lead screw and the end of the piston in a snug, rolling fit;
    the snug rolling fit between each ball and its ball section and between each ball and the end of its piston causing each ball to be interengaged between said spool and said lead screw whereby rotation of the lead screw causes movement of the nut along the lead screw in one direction; and
    said relieving the air pressure on said pistons providing for each ball to be moved out of its valley and onto the crest of the thread and thereby permit the nut to be moved along the lead screw in the opposite direction by a force applied thereto.

2. The combination of claim 1 wherein said nut further includes a plurality of said sets of bores.

* * * * *